United States Patent
Suetani

(10) Patent No.: US 11,095,785 B2
(45) Date of Patent: Aug. 17, 2021

(54) IMAGE READING APPARATUS, CONTROL METHOD OF IMAGE READING APPARATUS, AND STORAGE MEDIUM

(71) Applicant: CANON KABUSHIKI KAISHA, Tokyo (JP)

(72) Inventor: Yuki Suetani, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/740,306

(22) Filed: Jan. 10, 2020

(65) Prior Publication Data

US 2020/0236234 A1    Jul. 23, 2020

(30) Foreign Application Priority Data

Jan. 21, 2019  (JP) .............................. JP2019-007943

(51) Int. Cl.
    *H04N 1/00*    (2006.01)

(52) U.S. Cl.
    CPC ..... *H04N 1/00477* (2013.01); *H04N 1/00631* (2013.01); *H04N 1/00716* (2013.01); *H04N 1/00758* (2013.01); *H04N 1/00771* (2013.01); *H04N 1/00779* (2013.01); *H04N 1/00793* (2013.01)

(58) Field of Classification Search
    None
    See application file for complete search history.

(56) References Cited

U.S. PATENT DOCUMENTS

| | | | | | |
|---|---|---|---|---|---|
| 5,252,018 | A | * | 10/1993 | Kitahara | B42C 9/0056 412/11 |
| 5,384,631 | A | * | 1/1995 | Matsunami | B65H 3/06 271/110 |
| 5,458,324 | A | * | 10/1995 | Nakamura | B65H 7/12 271/10.02 |
| 6,003,853 | A | * | 12/1999 | Nakazawa | B65H 45/12 270/58.08 |
| 10,819,878 | B2 | * | 10/2020 | Hirao | H04N 1/047 |
| 10,962,913 | B2 | * | 3/2021 | Kawabata | G03G 15/6555 |
| 2003/0235448 | A1 | * | 12/2003 | Nemura | G03G 15/5029 399/389 |
| 2005/0280687 | A1 | * | 12/2005 | Kurahashi | B41J 11/009 347/139 |
| 2006/0216048 | A1 | * | 9/2006 | Fujii | G03G 15/5029 399/45 |

(Continued)

FOREIGN PATENT DOCUMENTS

JP          6-24604 A       2/1994
JP       2010-265044 A     11/2010

*Primary Examiner* — Anh-Vinh T Nguyen
(74) *Attorney, Agent, or Firm* — Canon U.S.A., Inc. I.P. Division

(57) ABSTRACT

Provided is an image reading apparatus in which a setting screen is displayed upon detecting that a document is placed on the document tray. In a case where a document is placed on an automatic document conveyance device, if a paper jam occurs while using the automatic document conveyance device, a screen of a paper jam is preferentially displayed even when a setting of automatically displaying a selection screen of a sheet thickness is set at the time. This prevents a specific screen desired to be continuously displayed from being hidden upon detecting that a document is placed on a document tray.

18 Claims, 15 Drawing Sheets

(56) References Cited

U.S. PATENT DOCUMENTS

| | | | |
|---|---|---|---|
| 2008/0174793 A1* | 7/2008 | Mutsuno | G06F 3/1234 358/1.6 |
| 2008/0174825 A1* | 7/2008 | Hatakeyama | B42C 11/04 358/1.18 |
| 2009/0103148 A1* | 4/2009 | Murakami | H04N 1/00411 358/498 |
| 2009/0136246 A1* | 5/2009 | Murakami | G03G 15/5029 399/45 |
| 2009/0196634 A1* | 8/2009 | Satoh | G03G 15/20 399/16 |
| 2009/0269090 A1* | 10/2009 | Murakami | H04N 1/2323 399/45 |
| 2010/0196039 A1* | 8/2010 | Ono | G03G 15/2039 399/69 |
| 2010/0310261 A1* | 12/2010 | Matsushima | B65H 7/12 399/16 |
| 2011/0058829 A1* | 3/2011 | Kondo | G03G 15/5029 399/45 |
| 2011/0079955 A1* | 4/2011 | Motoi | B65H 31/10 271/278 |
| 2011/0081185 A1* | 4/2011 | Motoi | B65H 35/04 399/407 |
| 2011/0210506 A1* | 9/2011 | Yamazaki | B65H 7/02 271/265.04 |
| 2011/0262152 A1* | 10/2011 | Koizumi | G03G 15/1605 399/16 |
| 2013/0051824 A1* | 2/2013 | Bobo | G03G 15/2032 399/45 |
| 2013/0155448 A1 | 6/2013 | Link | |
| 2014/0139896 A1* | 5/2014 | Osakabe | H04N 1/00636 358/498 |
| 2015/0102548 A1* | 4/2015 | Balili | B65H 39/00 270/58.09 |
| 2015/0104202 A1* | 4/2015 | Caneza | G03G 15/6541 399/16 |
| 2015/0281492 A1* | 10/2015 | Mamura | H04N 1/00726 358/1.15 |
| 2015/0293487 A1* | 10/2015 | Takenaga | G01B 5/24 356/73 |
| 2016/0139554 A1* | 5/2016 | Yoshimizu | H04N 1/00716 399/367 |
| 2016/0187826 A1* | 6/2016 | Mamura | G03G 15/5029 399/45 |
| 2016/0299465 A1* | 10/2016 | Hashimoto | G03G 21/00 |
| 2017/0174457 A1* | 6/2017 | Hirota | G03G 15/5029 |
| 2017/0336748 A1* | 11/2017 | Maejima | G03G 15/6514 |
| 2017/0341890 A1* | 11/2017 | Hayashi | B65H 7/04 |
| 2018/0259890 A1* | 9/2018 | Onodera | G03G 15/50 |
| 2018/0348686 A1* | 12/2018 | Matsumoto | G03G 15/5029 |
| 2019/0052767 A1* | 2/2019 | Nagano | H04N 1/00816 |
| 2019/0080212 A1* | 3/2019 | Yamaguchi | G06K 15/1868 |
| 2019/0232639 A1* | 8/2019 | Numauchi | B41M 1/14 |
| 2019/0291993 A1* | 9/2019 | Shiba | G03G 15/502 |
| 2020/0096810 A1* | 3/2020 | Nishiwaki | G02F 1/133512 |
| 2020/0137259 A1* | 4/2020 | Totsuka | H04N 1/3263 |
| 2020/0236234 A1* | 7/2020 | Suetani | H04N 1/00716 |
| 2020/0264103 A1* | 8/2020 | Tomishima | G01B 11/0625 |
| 2020/0310315 A1* | 10/2020 | Yamazaki | G03G 15/5062 |
| 2021/0048770 A1* | 2/2021 | Kawabata | G03G 15/5029 |
| 2021/0048771 A1* | 2/2021 | Kawabata | G03G 15/6594 |

* cited by examiner

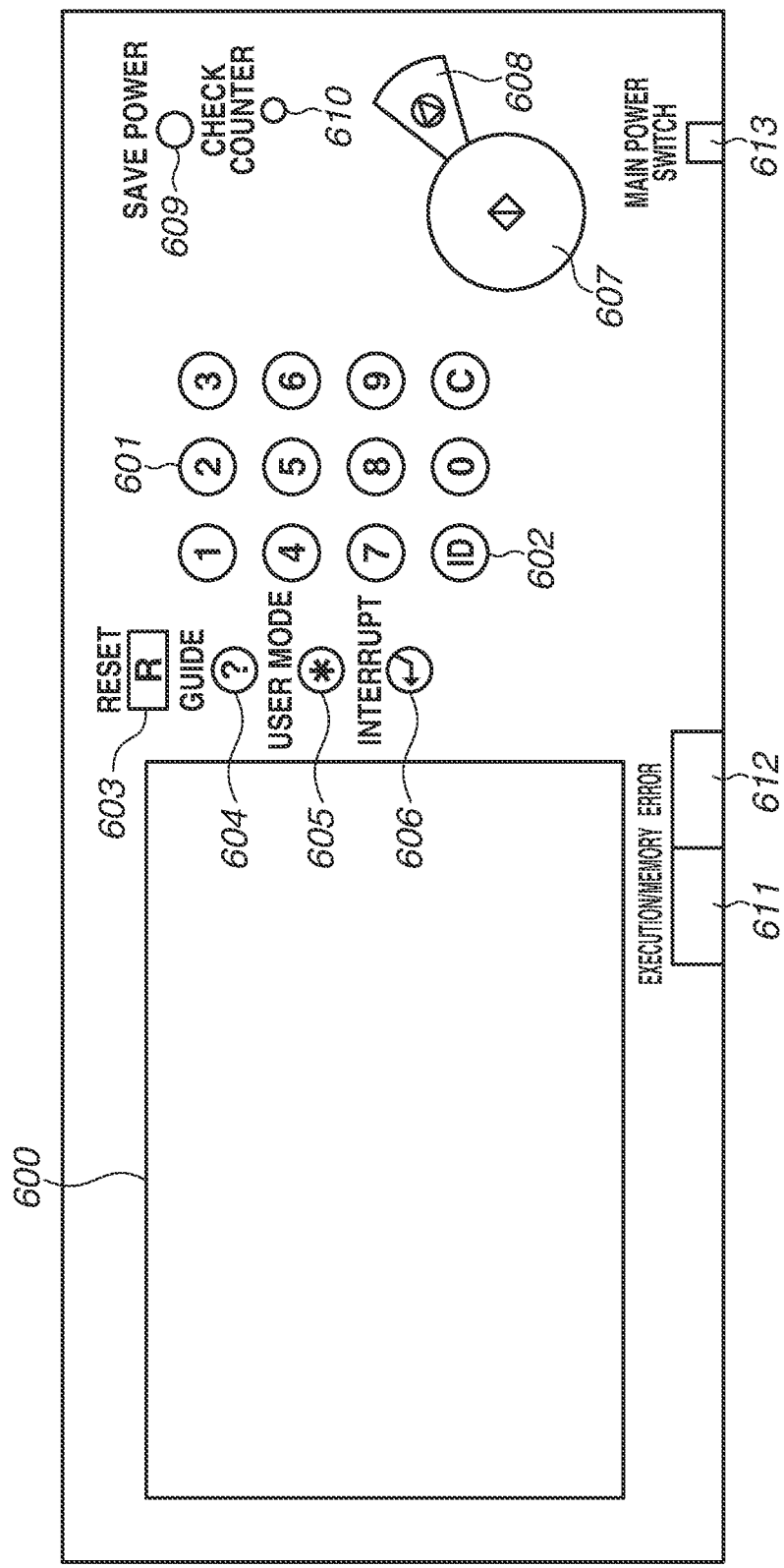

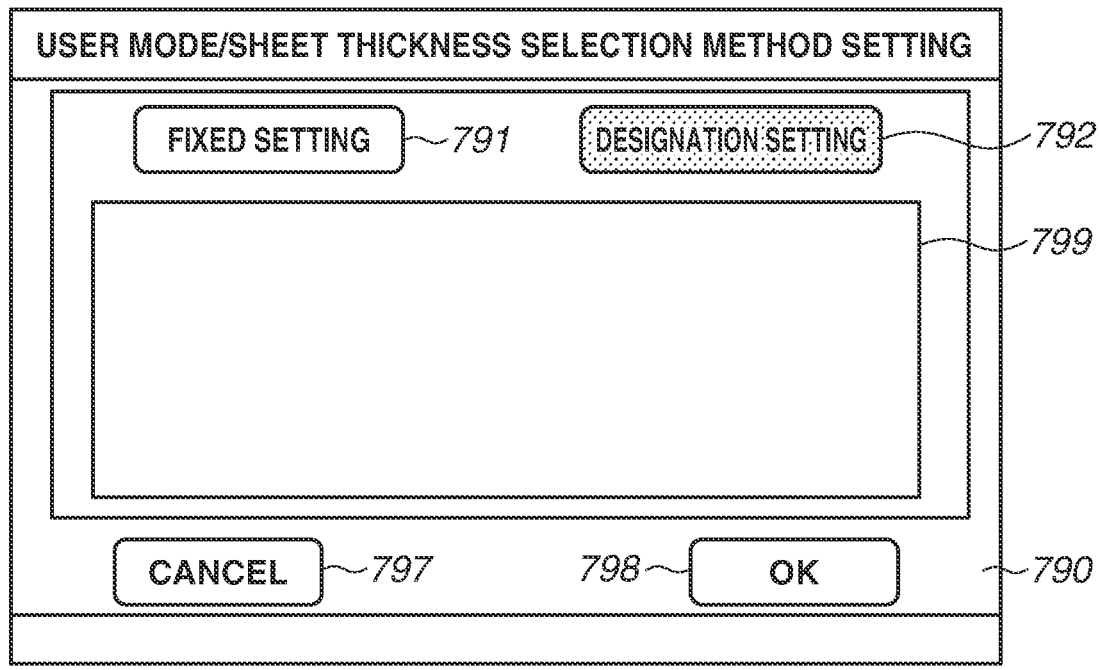

FIG.7

| APPARATUS SETTING | |
|---|---|
| SHEET THICKNESS SELECTION METHOD | FIXED SETTING |
| SHEET THICKNESS FIXED SETTING | THICK PAPER |
| SHEET THICKNESS DESIGNATION SETTING | — |
| . . . . | . . . . |

| COPY SETTING | |
|---|---|
| SHEET THICKNESS SETTING | THICK PAPER |
| PRINT PAGE | APPLY |
| N-IN-ONE PRINTING | NOT APPLY |
| BOOKBINDING | NOT APPLY |
| NUMBER OF COPIES | 5 |
| . . . . | . . . . |

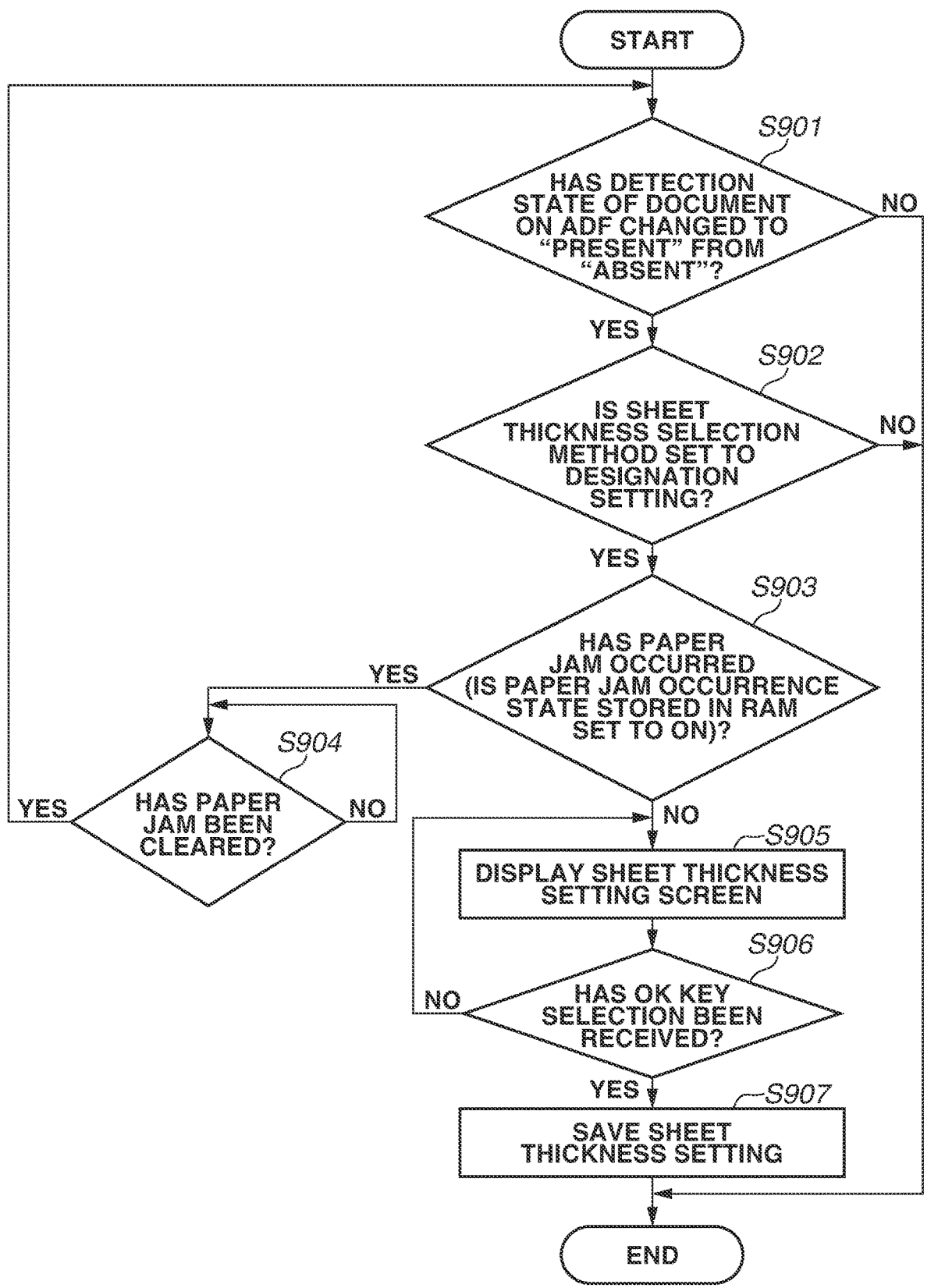

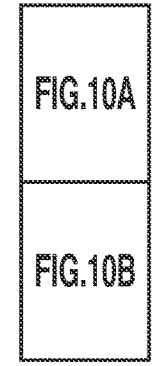
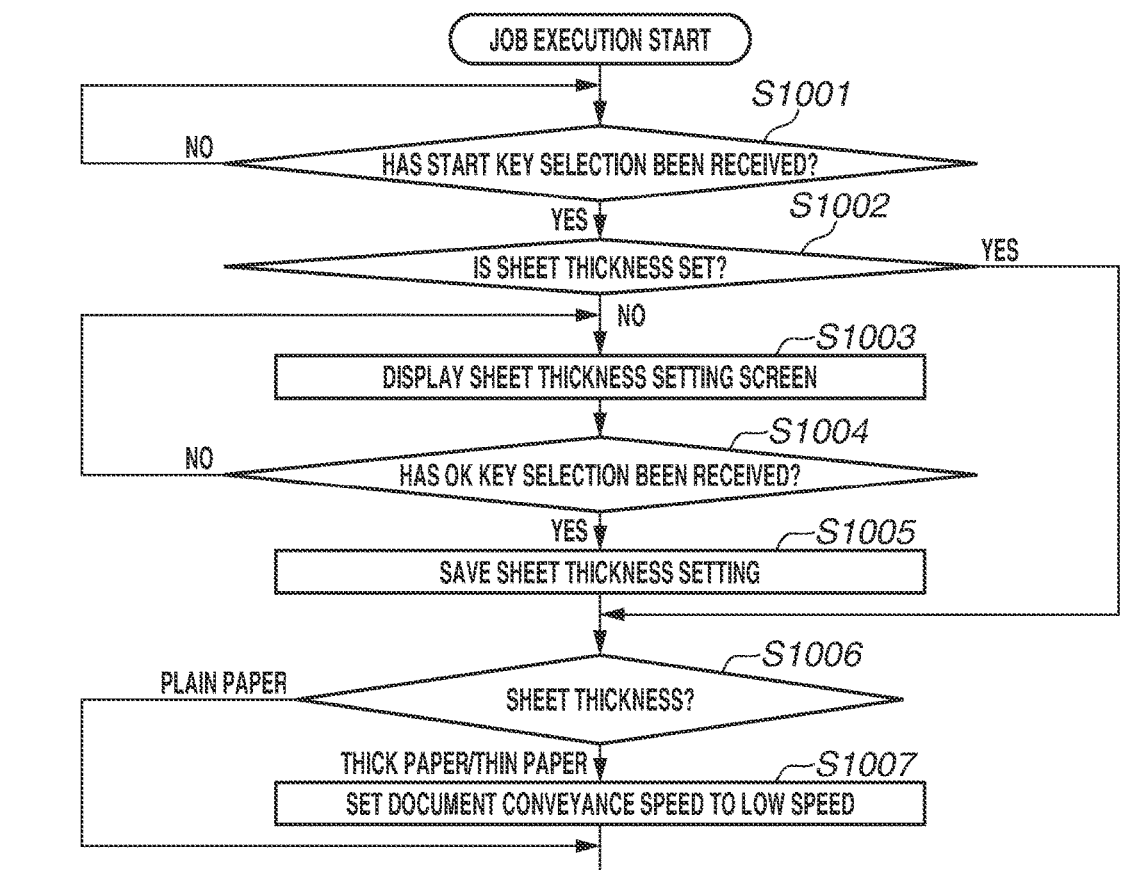

FIG. 11

STRUCTURE OF POP-UP SCREEN DISPLAY

| SCREEN ID ~1101 | DISPLAY PRIORITY ORDER ~1102 | STATE NAME ~1103 | STATE BIT (ON:1/OFF:0) ~1104 | |
|---|---|---|---|---|
| 10000 | 1 | SHUTDOWN IS BEING EXECUTED | 0 | ... |
| ... | ... | ... | ... | ... |
| 10020 | 20 | PAPER JAM HAS OCCURRED | 1 | ... |
| ... | ... | ... | ... | ... |
| 10070 | 70 | SHEET THICKNESS DESIGNATION SETTING IS SET | 1 | ... |
| ... | ... | ... | ... | ... |

IMAGE READING APPARATUS, CONTROL METHOD OF IMAGE READING APPARATUS, AND STORAGE MEDIUM

BACKGROUND OF THE INVENTION

Field of the Invention

The present invention relates to an image reading apparatus that controls the conveyance of a document based on the thickness of the document, a control method of an image reading apparatus, and a storage medium.

Description of the Related Art

When thick paper is used as a document to be read by an automatic document conveyance device, a jam easily occurs because a load on a conveyance roller becomes higher at a curved portion of a conveyance path. On the other hand, when thin paper is used as a document, because the weight of the document is light, it takes time for the document discharged to a sheet discharging unit to completely settle, and the rear end of a document collides with the leading end of a subsequent document. Such collision leads to a jam and a stack failure.

For solving such problems, there has been conventionally known an apparatus that detects the thickness of a document using a sensor and varies a conveyance speed of the document in accordance with the detected thickness (Japanese Patent Application Laid-Open No. H6-24604).

SUMMARY OF THE INVENTION

An automatic document conveyance device that prompts a user to set the thickness of a document by the user placing the document on a document tray of the automatic document conveyance device when a copy screen is being displayed is proposed. The automatic document conveyance device can thereby recognize the thickness of a document without using a sensor.

Nevertheless, depending on the types of screens being displayed, some screens are undesired to be switched when a document is placed.

For example, such screens include a screen for notifying a way of clearing a paper jam. Because the user clears a paper jam while viewing the screen, the clearing of the paper jam is disturbed if the screen is hidden upon the placement of a document onto a document tray.

According to an aspect of the present invention, an image reading apparatus that conveys a document placed on a document tray, based on information indicating a thickness of the document, includes a detection unit configured to detect that a document is placed on the document tray, a display unit configured to display a setting screen for setting a thickness of the document, upon the detection unit detecting that the document is placed on the document tray, a conveyance control unit configured to control, based on information indicating a thickness of a document that is set on a setting screen displayed by the display unit, a conveyance unit to convey the document, and a reading unit configured to read an image on a document conveyed by the conveyance unit, wherein, in a state where a specific screen is being displayed by the display unit, the setting screen is not displayed even when a document is placed on the document tray.

Further features of the present invention will become apparent from the following description of exemplary embodiments with reference to the attached drawings.

BRIEF DESCRIPTION OF THE DRAWINGS

FIG. 4 is a diagram illustrating an operation unit.

FIGS. 6A, 6B, and 6C each illustrate an example of a sheet thickness selection method setting screen to be displayed on the LCD touch panel.

FIG. 7 is a diagram illustrating a structure of a setting value saved in a random access memory (RAM).

FIG. 9 is a flowchart illustrating a sheet thickness setting according to the first exemplary embodiment.

FIGS. 10A and 10B (collectively FIG. 10) are flowcharts illustrating processing performed when a job is executed according to the first exemplary embodiment.

FIG. 11 illustrates an example of a display structure a pop-up screen that is saved in the RAM.

DESCRIPTION OF THE EMBODIMENTS

Hereinafter, exemplary embodiments of the present invention will be described with reference to the drawings. Each of the embodiments of the present invention described below can be implemented solely or as a combination of a plurality of the embodiments or features thereof where necessary or where the combination of elements or features from individual embodiments in a single embodiment is beneficial.

Figure 1:
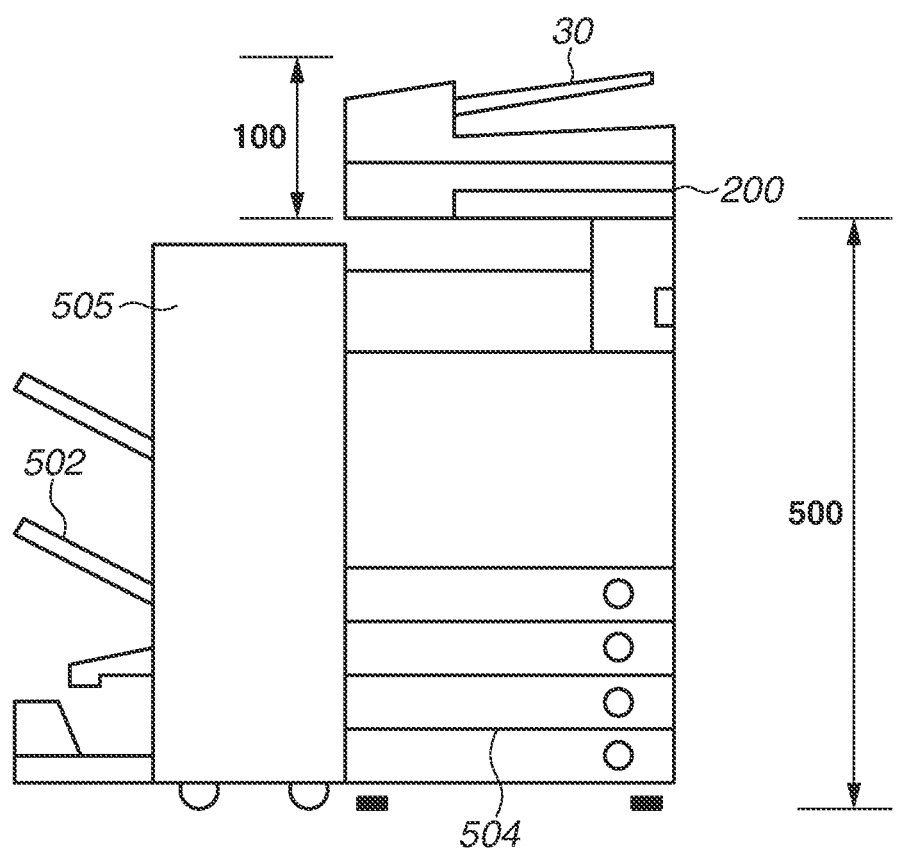
FIG. 1 is a diagram illustrating an external appearance example of an image forming apparatus according to the present exemplary embodiment.

A first exemplary embodiment will be described. FIG. 1 is a diagram illustrating an external appearance example of an image forming apparatus serving as an example of an image reading apparatus.

The image forming apparatus according to the present exemplary embodiment includes an image reading unit 200 and an image forming unit 500.

The image reading unit 200 converts information regarding an image on a document into an electrical signal by inputting reflected light obtained by exposing and scanning the image with light emitted from an illumination lump, to a linear image sensor (charge-coupled device (CCD) sensor). The image reading unit 200 further converts the electrical signal into a luminance signal including colors of red (R), green (G), and blue (B), and outputs the luminance signal to a controller of the image forming apparatus as image data.

The document is set onto a document installation tray 30 of an automatic document feeder (hereinafter, "ADF") 100. If a user issues an execution instruction for reading processing via an operation unit of the image forming apparatus, the controller of the image forming apparatus transmits a document reading instruction to the image reading unit 200. Upon receipt of the document reading instruction, the image reading unit 200 feeds documents from the document installation tray 30 of the ADF 100 one by one, and performs a reading operation of the documents. Alternatively, the user can also perform the read operation of documents by placing the documents on a platen glass to be described below.

The image forming unit 500 is an image forming device that forms an image onto a sheet based on image data received from a controller unit 400.

An image forming method according to the present exemplary embodiment is an electrophotographic method that uses a photosensitive drum and a photosensitive belt. The image forming unit 500 includes, as a sheet feeding unit 504, a plurality of cassettes adapted to different sheet sizes or different sheet orientations. A printed sheet is discharged to a sheet discharging unit 502. A finisher unit 505 performs postprocessing such as stapling or punching processing on the sheet based on a setting made by the user.

Figure 2:
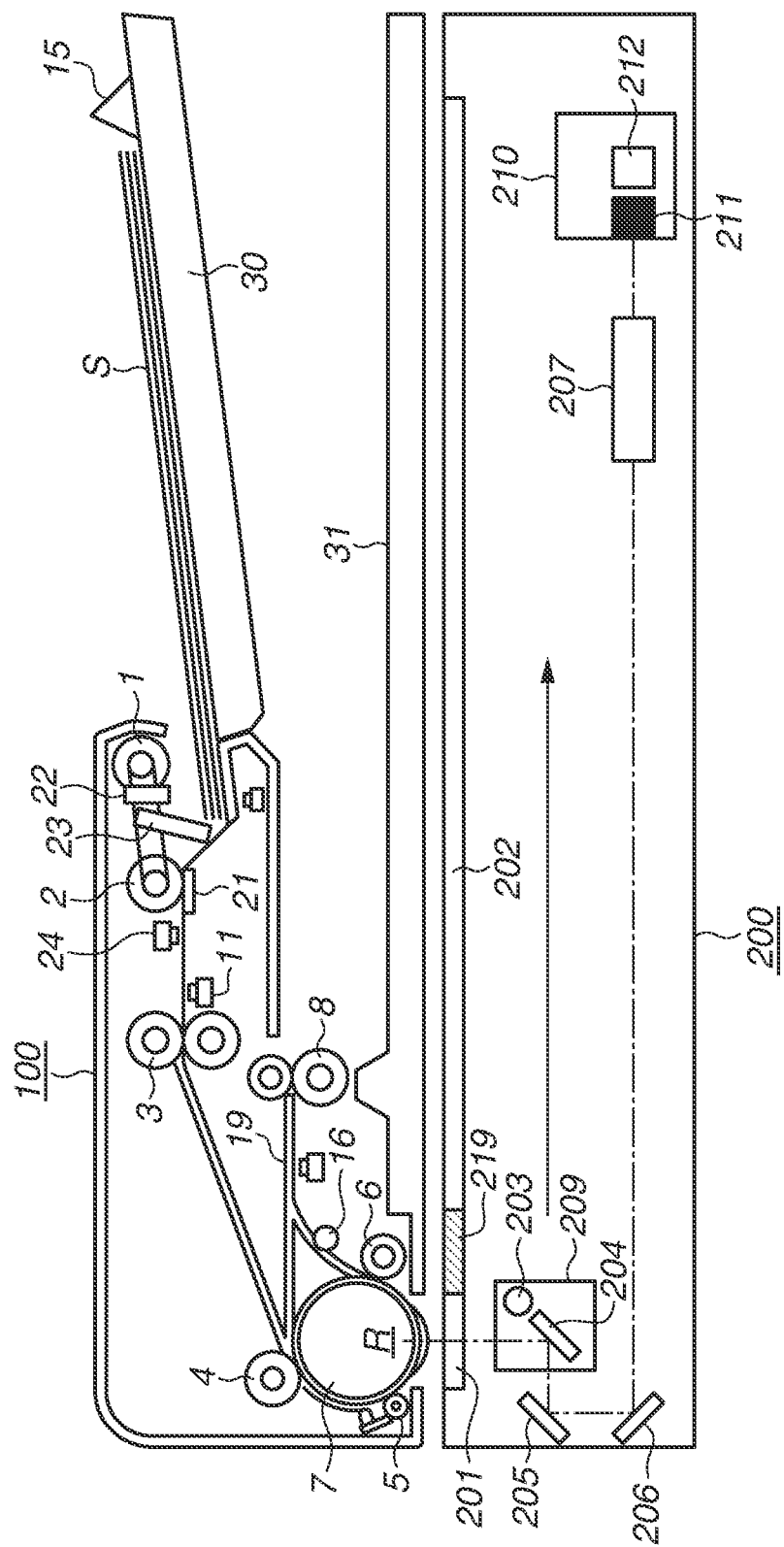
FIG. 2 is a cross-sectional view schematically illustrating a configuration example of an image reading unit of an automatic document feeder (ADF) according to the present exemplary embodiment.

FIG. 2 is a cross-sectional view schematically illustrating a configuration example of the image reading unit 200 of the ADF 100 according to the present exemplary embodiment.

An operation of the ADF 100 will be described with reference to FIG. 2. The ADF 100 illustrated in FIG. 2 includes the document installation tray 30, a separation pad 21, and a sheet feeding roller 1. A document bundle S including one or more document sheets is stacked on the document installation tray 30. The separation pad 21 prevents the document bundle S from protruding from the document installation tray 30 and moving forward to a downstream side before a conveyance start of the documents. The ADF 100 further includes a document detection sensor 23, a distance measuring sensor 22, and a separation sensor 24. The document detection sensor 23 detects that the document bundle S is stacked on the document installation tray 30. The distance measuring sensor 22 measures a distance from the uppermost surface of the document bundle S. The separation sensor 24 detects that a document has passed through a separation roller 2. The document detection sensor 23 may be provided below a document and detect that the document is placed. The sheet feeding roller 1 falls onto the document surface of the document bundle S stacked on the document installation tray 30 and rotates. The uppermost document of the document bundle S is thereby fed. The one document conveyed by the sheet feeding roller 1 is separated from the other documents by the function of the separation roller 2 and the separation pad 21. The separation is implemented by a known retard separation technique. At this time, if the separation sensor 24 does not detect a document after a certain period of time (t1) elapses from a conveyance start, the driving of the sheet feeding roller 1 is stopped. The certain period of time (t1) until the driving is stopped is set in view of a time it takes for a document to reach the separation sensor 24 from a conveyance start, which is predicted in accordance with a conveyance speed, further taking into account an adequate delay time.

The document separated by the separation roller 2 and the separation pad 21 is conveyed to a registration roller 4 by a conveyance roller 3, and the document collides with the registration roller 4. The document is thereby formed into a loop shape, and the skew of the document in the conveyance is corrected. A sheet feeding path is disposed on the downstream side of the registration roller 4. The feeding path conveys the document that has passed through the registration roller 4, toward a moving document reading glass 201.

The document fed to the sheet feeding path is fed onto a platen by a large roller 7 and a conveyance roller 5. At this time, the large roller 7 contacts the moving document reading glass 201. The document conveyed by the large roller 7 passes through a conveyance roller 6, moves between a roller 16 and a moving glass, and is discharged to a document discharging tray 31 via a sheet discharging flapper and a sheet discharging roller 8.

The ADF 100 illustrated in FIG. 2 reads a rear surface image of a document by reversing the document. By reversing the sheet discharging roller 8 and switching the sheet discharging flapper in a state where the sheet discharging roller 8 retains the document, the ADF 100 moves the document toward a reversing path 19. The ADF 100 causes the moved document to collide with the registration roller 4 from the reversing path 19, and the document is formed into a loop shape again. The skew of the document in the conveyance is thereby corrected. After that, by the conveyance roller 5 and the large roller 7 moving the document again to the moving document reading glass 201, the ADF 100 can read the rear surface of the document by the moving document reading glass 201.

The document installation tray 30 is provided with a guide regulation plate 15 slidable in a sub scanning direction of the stacked document bundle S, and is also provided with a document width detection sensor (not illustrated) that detects a document width in conjunction with the guide regulation plate 15. By the combination of the above-described document width detection sensor and a pre-registration sensor 11, a document size of the document bundle S stacked on the document installation tray 30 becomes detectable. In addition, using a document length detection sensor (not illustrated) provided in a conveyance path, it is possible to detect a document length based on a conveyance distance from a detected leading end to a detected rear end of the document being conveyed. It is also possible to detect a document size by the combination of the detected document length and the above-described document width detection sensor.

(Configuration Example of Image Reading Unit 200)

By an optical scanner unit 209 scanning a document on a platen glass 202 in the sub scanning direction indicated by an arrow in FIG. 2, the image reading unit 200 optically reads image information recorded on the document. In addition, the image reading unit 200 controls the ADF 100 to convey the documents on the document installation tray 30 to a reading position one by one. Furthermore, the image reading unit 200 moves the optical scanner unit 209 to a reading center position R of the large roller 7 of the ADF 100, and reads the document at the reading center position R of the large roller 7. A document on the ADF 100 or a document on the platen glass 202 is read by the following optical system. The optical system includes the moving document reading glass 201, the platen glass 202, the optical scanner unit 209 including a lamp 203 and a mirror 204, mirrors 205 and 206, a lens 207, and a CCD sensor unit 210. The read image information is photoelectrically converted and the converted image information is input to a controller unit not illustrated in FIG. 2, as image data. A white board 219 is a white board for creating white level reference data by shading.

In the present exemplary embodiment, the CCD sensor unit 210 includes a color image reading (RGB) CCD sensor (three-line sensor unit) 212 and a monochrome image reading CCD sensor (single-line sensor unit) 211.

In the present exemplary embodiment, the description has been given of an example in which the image reading unit 200 reads a rear surface image of a document by the ADF 100 reversing the document. The image reading unit 200 may include both of a document front surface reading CCD sensor and a document rear surface reading CCD sensor, and read both surfaces of a document in one document conveyance.

(Control Block of ADF 100)

Figure 3:
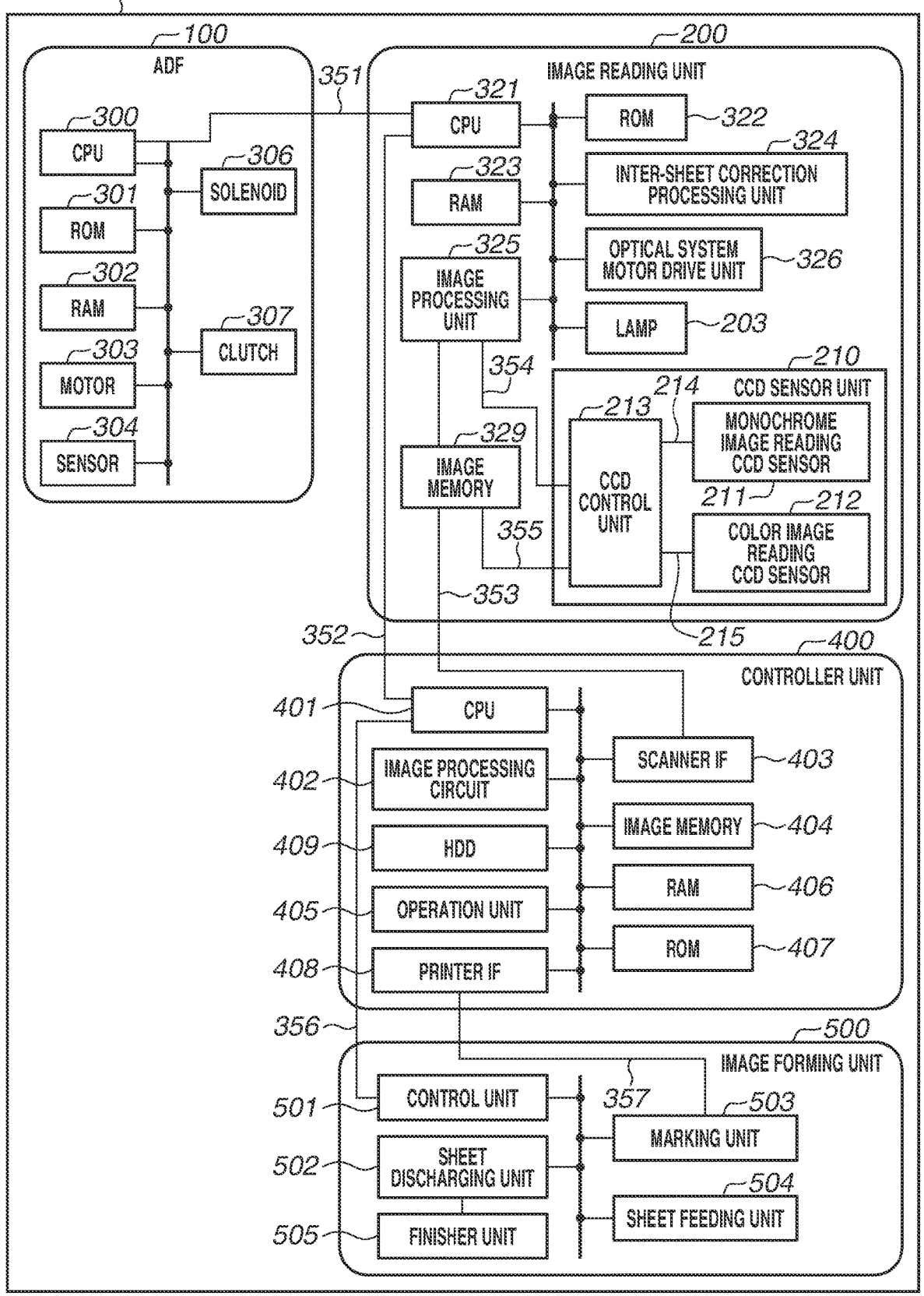
FIG. 3 is a block diagram illustrating a configuration of the image forming apparatus according to the present exemplary embodiment.

FIG. 3 is a block diagram illustrating a configuration of the image forming apparatus according to the present exemplary embodiment.

A control block of the ADF 100 includes a central processing unit (CPU) 300 serving as a control unit, a read-only memory (ROM) 301, a random access memory (RAM) 302, an output port, and an input port. Control programs and fixed parameters are stored in the ROM 301, and input data and work data are stored in the RAM 302.

A motor 303 that drives various conveyance rollers, a solenoid 306, and a clutch 307 are connected to the output port, and various sensors 304 are connected to the input port. For example, the sensors 304 include paper jam detection sensors provided at predetermined intervals on a conveyance path, in addition to the document width detection sensor and the document length detection sensor.

The CPU 300 controls sheet conveyance in accordance with a control program stored in the ROM 301 connected via a bus line. The CPU 300 performs serial communication with a CPU 321 of the image reading unit 200 via a control communication line 351, and exchanges control data with the image reading unit 200. An image leading end signal serving as a reference of a leading end of document image data is also notified to the image reading unit 200 via the control communication line 351.

The CPU 300 notifies values of the various sensor 304 to the image reading unit 200 in accordance with control data from the CPU 321 of the image reading unit 200.

(Control Block of Image Reading Unit 200)

In a control block of the image reading unit 200, the CPU 321 performs all the controls of the image reading unit 200. A ROM 322 that stores programs and a RAM 323 that provides a work area are connected to the CPU 321. The RAM 323 provides a work area including an area for performing nonvolatile storage.

An optical system motor drive unit 326 is a driver circuit for driving an optical system drive motor. In the image reading unit 200, the lamp 203 and the CCD sensor unit 210 (the monochrome image reading CCD sensor 211 for front surface images/the color image reading CCD sensor 212 for front surface images) are connected the image reading unit 200. The CPU 321 executes image reading processing by controlling the optical system motor drive unit 326 and controlling the CCD sensor unit 210 via an image processing unit 325.

For implementing sheet conveyance, the CPU 321 issues an instruction by transmitting a command regarding sheet conveyance control to the CPU 300 for sheet conveyance control of the ADF 100 via the control communication line 351. Upon receipt of the instruction, the CPU 300 implements sheet conveyance by monitoring the sensors 304 installed on the conveyance path, and driving the conveyance motor 303, the solenoid 306, and the clutch 307 serving as loads. In this manner, the CPU 321 causes the ADF 100 to perform sheet conveyance and causes the image reading unit 200 to perform image reading control. An inter-sheet correction processing unit 324 performs inter-sheet correction.

An image signal formed by the lens 207 on the CCD sensor unit 210 (either the color image reading (RGB) CCD sensor 212 or the monochrome image reading CCD sensor 211) is converted into digital image data. Furthermore, various types of image processing for detecting and correcting a streaky image on image data, such as shading, are executed on the converted image data by the image processing unit 325, and the resultant image data is written into an image memory unit 329.

The data written in the image memory unit 329 are sequentially transmitted to the controller unit 400 via a controller/interface image data information communication line 353 including an image transfer clock signal line. Furthermore, an image leading end signal serving as a reference for a leading end of document image data is notified to the controller unit 400 via a controller/interface control communication line 352 at a timing adjusted by the CPU 321. An image leading end signal notified via a communication line from the ADF 100 is similarly notified to the controller unit 400 via the controller/interface control communication line 352 at a timing adjusted by the CPU 321 of the image reading unit 200.

The CPU 321 controls the image processing unit 325 connected to a control bus line. Furthermore, the CPU 321 controls the CCD sensor unit 210 by transmitting a control signal from a control communication line 354 to the CCD sensor unit 210 via the image processing unit 325. While a document image is scanned by the CCD sensor unit 210, the document image is read by the color image reading CCD sensor 212 or the monochrome image reading CCD sensor 211. Then, an analog image signal corresponding to read one line is output to a CCD control unit 213 from an image data communication line 214 or 215 including an image transfer clock signal line.

The analog signal is converted into the digital image data by the CCD control unit 213 and transmitted to the controller unit 400 via the image data information communication line 353 by way of the image memory unit 329 from an image data information communication line 355 including an image transfer clock signal line.

The CPU 321 performs serial communication with a CPU 401 of the controller unit 400 via the image data information communication line 353, and exchanges control data with the controller unit 400. Based on control data from the CPU 401 of the controller unit 400, the CPU 321 detects a shape abnormality in a document being conveyed. In the shape abnormality detection, for each document, a difference between a distance from the uppermost surface of the document bundle S that has been measured before a conveyance start, and a distance from the uppermost surface of the document bundle S that has been measured after a certain period of time (t2) elapses from the conveyance start is calculated, and if the calculated difference is equal to or larger than a predetermined difference (d1), it is determined that the document has a shape abnormality. Then, the CPU 321 notifies the determination result to the CPU 401 of the controller unit 400.

(Control Block of Controller Unit 400)

The controller unit 400 for image processing is a device that controls an entire image forming apparatus 1000 including the ADF 100, the image reading unit 200, and the image forming unit 500. The controller unit 400 includes the CPU 401, an image processing circuit 402, a scanner interface (IF) 403, an image memory 404, an operation unit 405, a RAM 406 that provides a work area, a ROM 407 that stores programs, a printer IF 408, and a hard disk drive (HDD) 409. The RAM 406 provides a work area including an area for performing nonvolatile storage. The ROM 407 and the HDD 409 are examples of a computer-readable storage medium.

Alternatively, a program may be loaded from the HDD 409 onto the RAM 406 and executed by the CPU 401.

The image data transmitted to the controller unit 400 via the image data information communication line 353 is saved into the image memory 404 via the scanner IF 403.

The image processing circuit 402 converts an image in the image memory 404 and returns the converted image to the image memory 404. The image conversion processing performed by the image processing circuit 402 includes rotation processing of rotating an image including 32 pixels×32 pixels at a designated angle, and resolution conversion processing of converting the resolution of an image. The image conversion processing performed by the image processing circuit 402 further includes scaling processing of scaling an image, and color space conversion processing of converting an input multivalued image from a YUV image into a Lab image using matrix calculation and a look-up table (LUT). The color space conversion uses 3×8 matrix calculation and a one-dimensional LUT, and can perform known background removal and show-through reduction.

The controller unit 400 includes a network interface (IF) (not illustrated), and performs transmission and reception of image data and other data with an external personal computer (PC).

(Control Block of Image Forming Unit 500)

The image forming unit 500 conveys recording paper (sheet), prints image data onto the recording paper as a visible image, and discharges the recording paper to the outside of the apparatus. The image forming unit 500 includes a control unit 501 that controls the image forming unit 500, the sheet feeding unit 504 including a plurality of types of recording paper cassettes, and a marking unit 503 having a function of transferring and fixing image data onto the recording paper. The image forming unit 500 further includes the sheet discharging unit 502 having a function of outputting the printed recording paper to the outside of the apparatus, and the finisher unit 505 that performs punching processing and sorting processing.

When the marking unit 503 becomes ready to perform image formation, the control unit 501 transmits an image leading end signal serving as a reference of a leading end, to the controller unit 400 via a controller/interface control communication line 356.

Then, the marking unit 503 transfers and fixes image data transmitted via a controller/interface image communication line 357, onto the recording paper.

Hereinafter, the operation unit 405 illustrated in FIG. 3 will be described with reference to FIG. 4. A liquid crystal display (LCD) touch panel 600 is used for performing main mode settings and status display. A numerical keypad 601 receives input of numerical values from 0 to 9. An ID key 602 is used for inputting a section number and a passcode mode when the apparatus is managed for each section.

A reset key 603 is a key for resetting a set mode. A guide key 604 is a key for displaying an explanatory screen of each mode. An interrupt key 606 is a key for performing interrupt copy.

A start key 607 is a key for receiving an execution instruction for copy or scan. A stop key 608 is a key for stopping a job being executed (copy job or scan job).

A user mode key 605 is a key for transitioning to a user mode screen. On the user mode screen, the image forming apparatus receives various settings regarding the apparatus.

A power saving key 609 is a key for shifting the image forming apparatus to a power saving state. If the power saving key 609 is selected again when the image forming apparatus is in the power saving state, the image forming apparatus returns from the power saving state.

A counter check key 610 is a key for displaying, on the LCD touch panel 600, a count screen displaying the total number of copies that have been used so far.

A light-emitting diode (LED) 611 indicates that the apparatus is executing a job or accumulating an image into an image memory. An error LED 612 indicates that the apparatus is in an error state such as a jam or door open. A power switch LED 613 indicates that a main switch of the apparatus is turned ON.

Figure 5A:
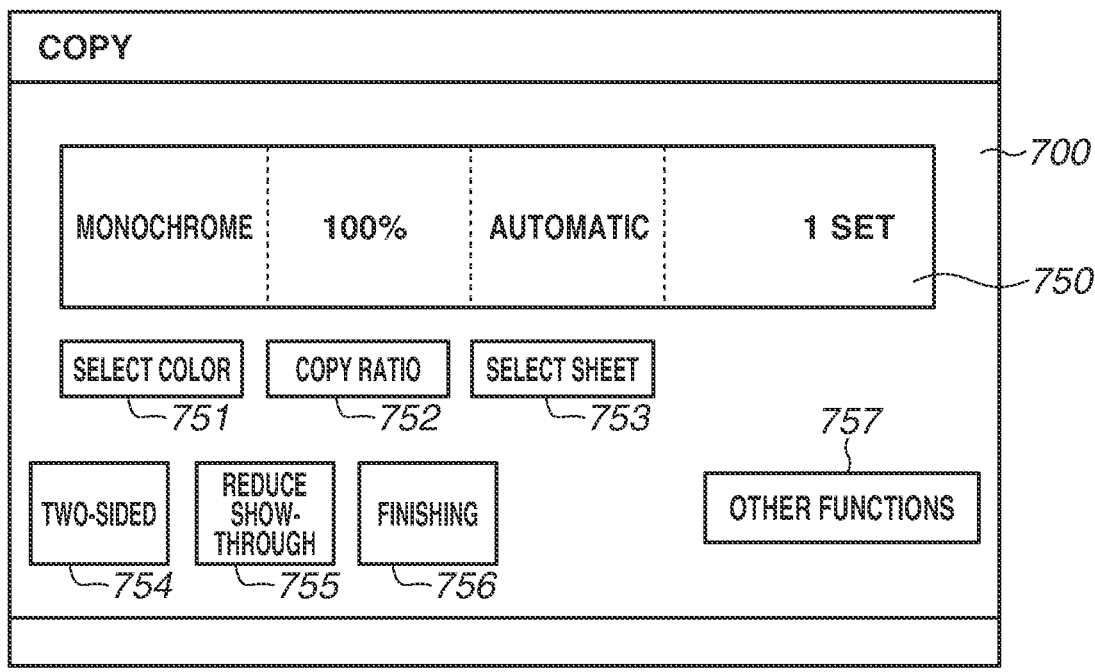
FIGS. 5A-5D each illustrate an example of a screen to be displayed on a liquid crystal display (LCD) touch panel.

A copy screen 700 illustrated in FIG. 5A is a screen to be displayed on the LCD touch panel 600. As basic settings, buttons for setting color selection 751, a copy ratio 752, and sheet selection 753 are disposed as illustrated in the copy screen 700 in FIG. 5, and these setting statuses are displayed in a region 750. The settings other than the basic settings can be selected by pressing an other functions button 757. FIG. 5C illustrates an other functions setting screen 760, and the setting of functions other than the color selection 751, the copy ratio 752, and the sheet selection 753 can be performed. A shortcut button of a function frequently-used by the user among these functions can be created on the copy screen. In this example, two-sided 754 for setting two-sided printing and show-through reduction 755 for setting show-through reduction of a document are disposed as shortcut buttons. Furthermore, finishing 756 for setting an output mode to be used in printing or for setting postprocessing is disposed as a shortcut button.

Figure 5B:
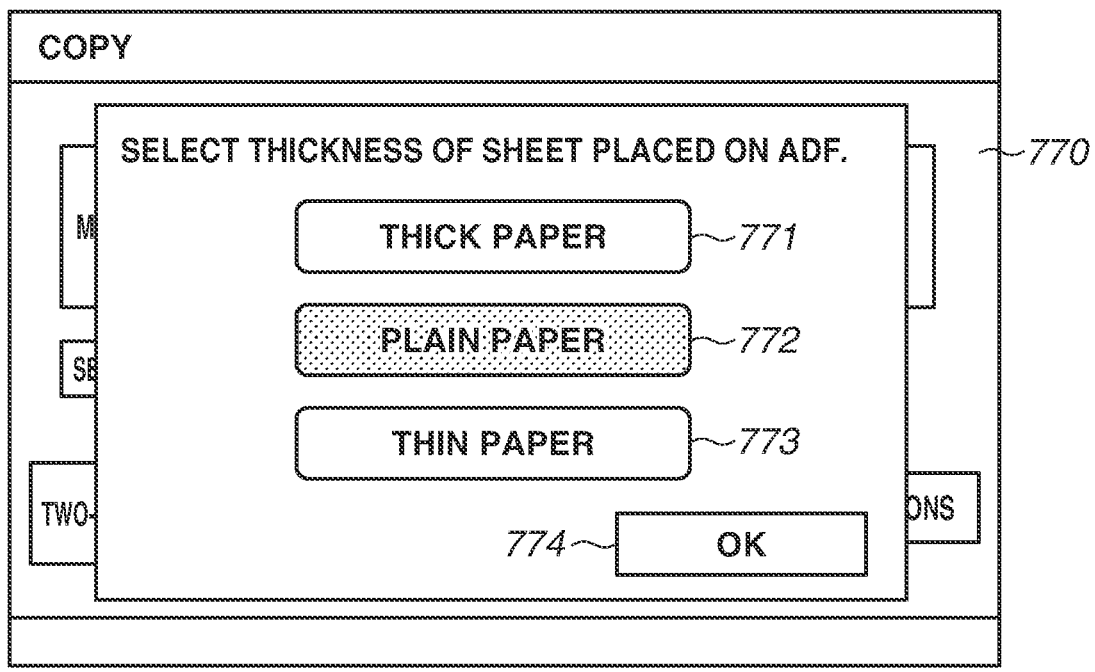
Figure 5C:
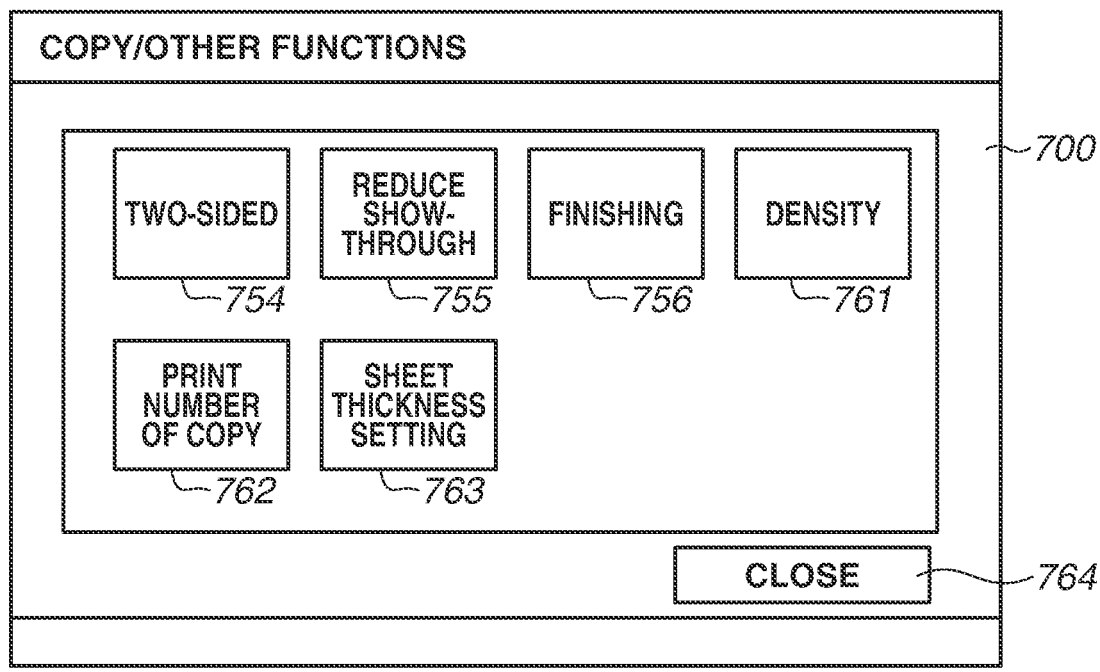

A sheet thickness setting screen 770 illustrated in FIG. 5B is an example of a screen for setting a sheet thickness of a document (thickness of paper). The sheet thickness setting screen 770 illustrated in FIG. 5B is displayed upon the document detection sensor 23 detecting a document, for example. Alternatively, the sheet thickness setting screen 770 can also be manually displayed by selecting a sheet thickness setting provided as the other functions 757. On the sheet thickness setting screen 770, thick paper 771, plain paper 772, or thin paper 773 is selectable. The description has been given of an example of displaying the thick paper 771, the plain paper 772, and the thin paper 773 as buttons. Alternatively, the thick paper 771, the plain paper 772, and the thin paper 773 may be displayed as a list including each button as one record. Buttons and records are examples of objects. By pressing an OK key 774 after selecting a sheet thickness, the user sets the selected sheet thickness. The set sheet thickness is saved into the RAM 406.

The other functions setting screen 760 illustrated in FIG. 5C is a screen for performing setting of advanced functions of a copy function. The other functions setting screen 760 is displayed when the other functions button 757 on the copy screen 700 is selected. The other functions setting screen 760 includes the two-sided 754, the show-through reduction 755, the finishing 756, and density 761 for setting print density. The other functions setting screen 760 also includes number of copy printing 762 for setting print designation of a copy number on a print document, and a sheet thickness setting 763 for setting a sheet thickness of a document. The number of copy printing 762 and the sheet thickness setting 763 are both displayed as buttons.

Figure 5D:
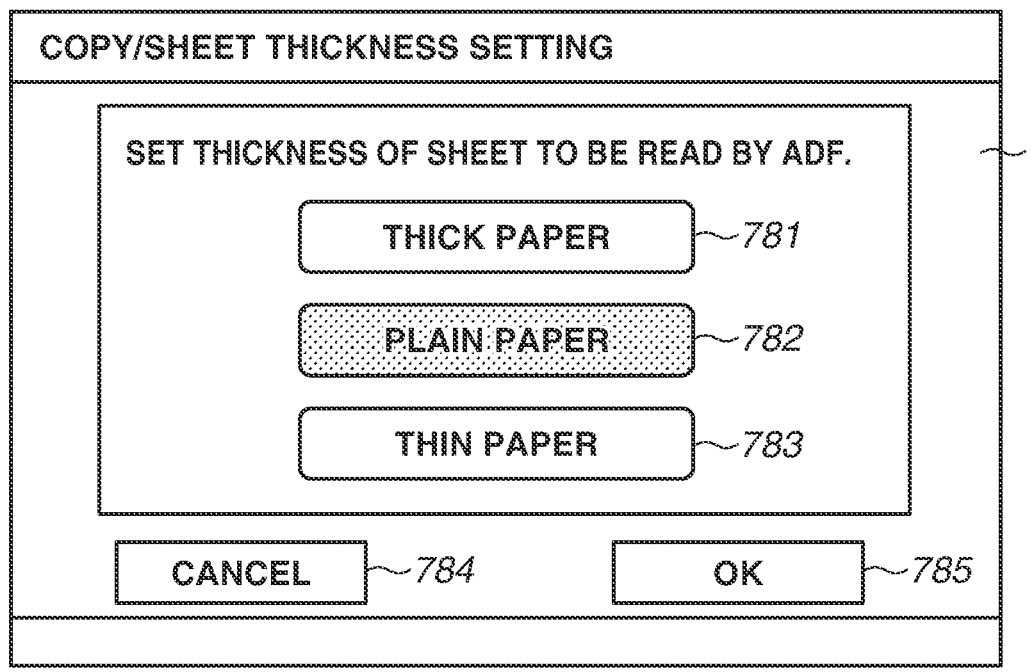

An advanced sheet thickness setting screen 780 in FIG. 5D illustrates an example of a screen for performing a sheet thickness setting. The advanced sheet thickness setting screen 780 is displayed when the sheet thickness setting 763 is pressed on the other functions setting screen 760. On the advanced sheet thickness setting screen 780, thick paper 781, plain paper 782, or thin paper 783 is selectable. By pressing an OK key 785 after selecting a sheet thickness, the selected sheet thickness is set. By selecting a cancel key 784, the setting of a sheet thickness can be cancelled. The description has been given of an example of displaying the thick paper 781, the plain paper 782, and the thin paper 783 as buttons. Alternatively, the thick paper 781, the plain paper 782, and the thin paper 783 may be displayed as a list including each button as one record. Buttons and records are examples of objects. By pressing the OK key 785 after selecting a sheet thickness, the user sets the selected sheet thickness. The set sheet thickness is saved into the RAM 406.

Figure 6A:
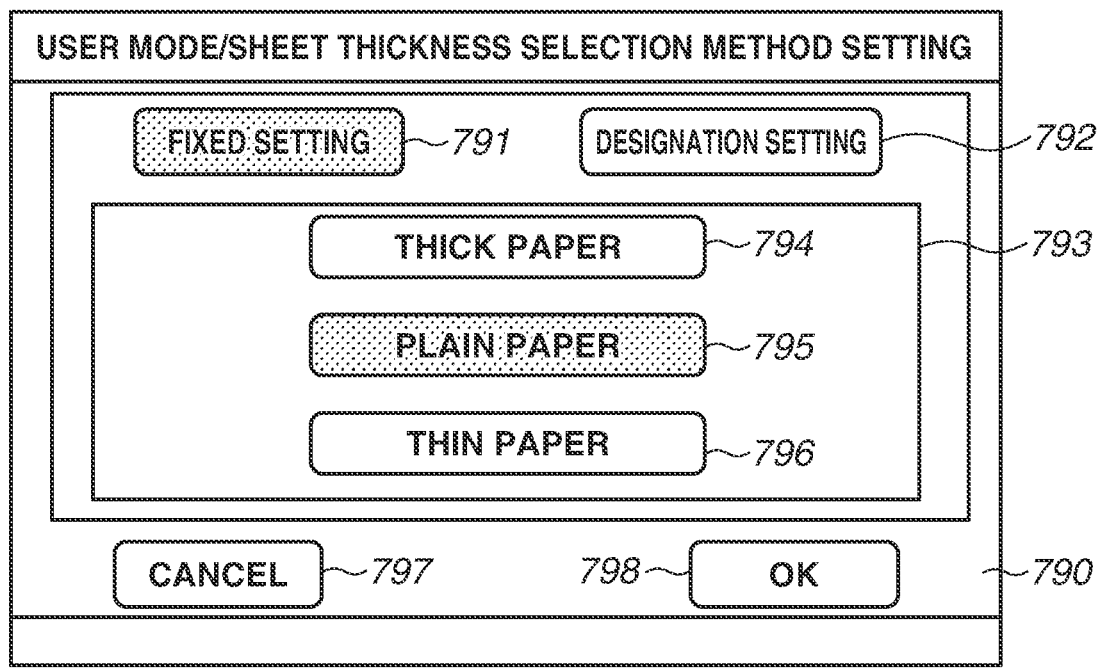

FIG. 6A illustrates an example of a sheet thickness selection method setting screen. The screen can be displayed by an operation performed on the user mode screen. The user mode screen is displayed by the press of the user mode key 605 on the operation unit 405. Functions for performing various settings in the image forming apparatus are additionally prepared on the user mode screen although these functions are not illustrated in the drawings.

A sheet thickness selection method setting screen 790 includes a fixed setting 791 and a designation setting 792, which are buttons for setting a sheet thickness selection method. The designation setting 792 is a button for enabling a function of automatically displaying the sheet thickness setting screen 770 upon detecting that a document is placed on the document installation tray 30. The fixed setting 791 is a button for disabling the function of automatically displaying the sheet thickness setting screen 770 upon detecting that a document is placed on the document installation tray 30. By selecting either the fixed setting 791 or the designation setting 792, the user can set the selected sheet thickness selection method. When the fixed setting 791 is selected, thick paper 794, plain paper 795, and thin paper 796 for performing a sheet thickness setting are displayed in a sheet thickness fixed setting region 793. The thick paper 794, the plain paper 795, or the thin paper 796 is selectable. If an OK key 798 is selected in a state where any one of the thick paper 794, the plain paper 795, and the thin paper 796 is selected, the fixed setting selected as a sheet thickness selection method and the selected sheet thickness are set and saved into the RAM 406.

Figure 6B:
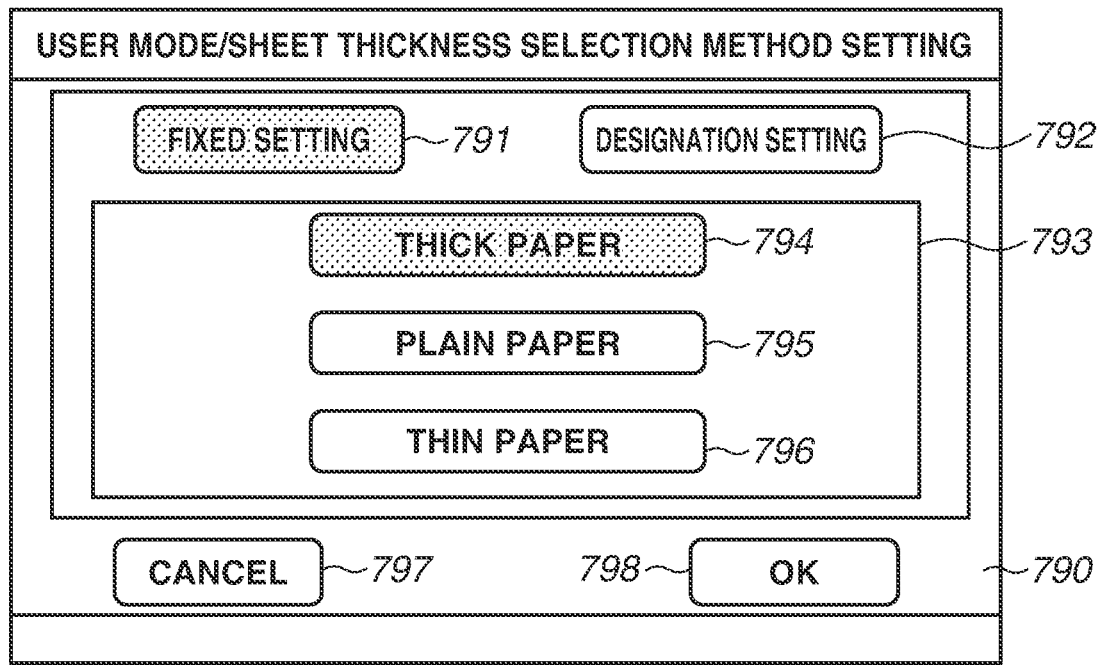

A specific example will be described with reference to FIG. 6B. FIG. 6B illustrates an example of a screen to be displayed when the fixed setting is selected as a sheet thickness selection method setting and thick paper is selected as a sheet thickness fixed setting. FIG. 6B illustrates a state where the fixed setting 791 is selected as a sheet thickness setting and the thick paper 794 is selected. By pressing the OK key 798 in this state, the fixed setting is set in a sheet thickness selection method setting 701 in FIG. 7, and thick paper is set in a sheet thickness fixed setting 702 in FIG. 7, which will be described below.

If a cancel key 797 is selected, the settings of a sheet thickness selection method and a sheet thickness can be cancelled.

FIG. 6C illustrates an example of a screen to be displayed when the designation setting 792 is selected as a sheet thickness selection method setting. When the designation setting 792 is selected as a sheet thickness setting, a setting button is not displayed in a sheet thickness fixed setting region 799. If the OK key 798 is pressed in this state, the designation setting is set in the sheet thickness selection method setting 701 in FIG. 7.

FIG. 7 is a diagram illustrating an example of a setting value saved in the RAM 406. An apparatus setting is an area for saving setting values used in common in the entire apparatus, and includes the sheet thickness selection method setting 701, the sheet thickness fixed setting 702, and a sheet thickness designation setting 703. An apparatus setting other than these may exist. A copy setting 710 is an area for saving setting values used in a copy function. As examples, the copy setting 710 includes a sheet thickness setting 711, page printing 712, N-in-one printing 713, bookbinding 714, and the number of copies 715. These setting items are examples, and a copy setting other than these may be saved. In addition, an area for saving setting values of functions other than the copy function such as a data transmission function may be provided.

The image forming apparatus according to the present exemplary embodiment controls the execution of a copy job based on these settings.

(Flowchart for Setting Sheet Thickness Selection Method Setting from User Mode Screen)

Figure 8:
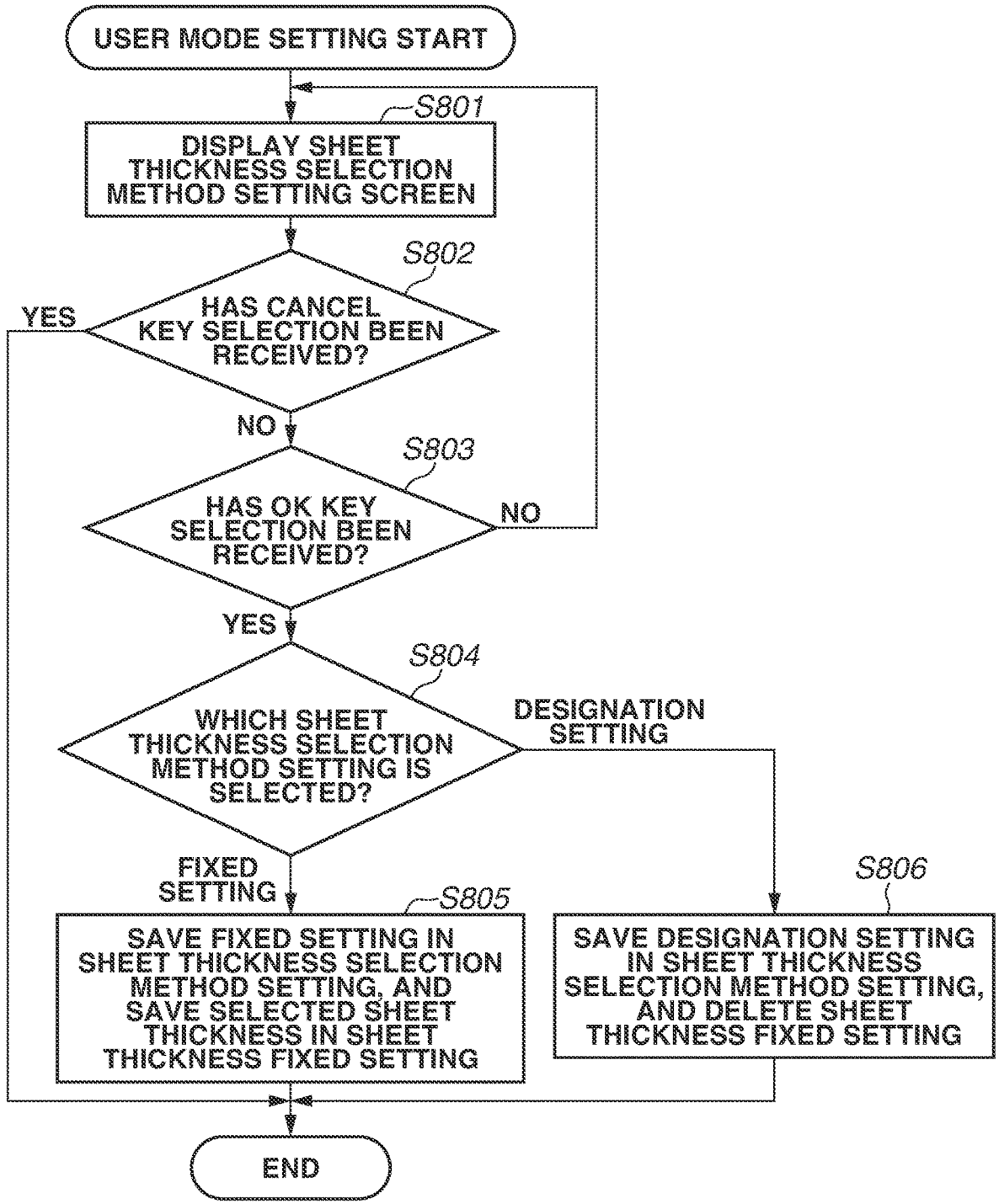
FIG. 8 is a flowchart illustrating a sheet thickness selection setting method according to a first exemplary embodiment.

First of all, a flowchart for setting a sheet thickness selection method setting from the user mode screen will be described with reference to FIG. 8.

The flowchart is started when the user mode key 605 of the operation unit 405 is selected, the user mode screen is displayed, and a sheet thickness selection method setting is selected from the user mode screen. In addition, the flowchart is performed by the CPU 401 of the controller unit 400 executing a control program read from the ROM 407 and loaded onto the RAM 406.

In step S801, the CPU 401 displays the sheet thickness selection method setting screen 790 illustrated in FIG. 6A, on the LCD touch panel 600. Then, the LCD touch panel 600 receives, on the sheet thickness selection method setting screen 790, the selection of the fixed setting 791 or the designation setting 792, and the selection of the thick paper 794, the plain paper 795, or the thin paper 796 displayed in the sheet thickness fixed setting region 793. The CPU 401 saves the received settings into the RAM 406.

Next, in step S802, the CPU 401 determines whether the selection of the cancel key 797 has been received. If the selection of the cancel key 797 has been received (YES in step S802), the CPU 401 ends this flow without reflecting the selection state on the sheet thickness selection method setting screen 790 in the apparatus setting. On the other hand, if the selection of the cancel key 797 has not been received (NO in step S802), the CPU 401 advances the processing to step S803.

In step S803, the CPU 401 determines whether the selection of the OK key 798 has been received. If the selection of the OK key 798 has been received (YES in step S803), the CPU 401 advances the processing to step S804, and if the selection of the OK key 798 has not been received (NO in step S803), the CPU 401 returns the processing to step S801.

In step S804, the CPU 401 determines which setting of the fixed setting 791 and the designation setting 792 is selected as a sheet thickness selection method setting, and if the fixed setting 791 is selected ("FIXED SETTING" in step S804), the CPU 401 advances the processing to step S805, and if the designation setting 792 is selected ("DESIGNATION SETTING" in step S804), the CPU 401 advances the processing to step S806.

In step S805, the CPU 401 saves the fixed setting in the sheet thickness selection method setting 701 in the apparatus setting. Then, the CPU 401 saves a sheet thickness selected from among the thick paper 794, the plain paper 795, and the thin paper 796 displayed in the sheet thickness fixed setting region 793, in the sheet thickness fixed setting 702, and ends this flowchart.

In step S806, the CPU 401 saves the designation setting in the sheet thickness selection method setting 701 in the apparatus setting, and ends this flowchart.

FIG. 11 illustrates an example of a management structure of screen information for controlling the display of a screen that is saved in the RAM 406, and the management structure has a table structure. Information regarding a screen that can be displayed on the image forming apparatus is stored.

A screen ID 1101 is uniquely allocated for each type of a screen, and the type of a screen can be uniquely identified based on the screen ID 1101. A display priority order 1102, a state name 1103, and a state bit 1104 are stored in association with the screen ID 1101. An item other than these may be stored, but the description will be omitted. In addition, a screen ID other than the examples of screen IDs illustrated in FIG. 11 may be stored, but the description will be omitted.

In the table illustrated in FIG. 11, the highest display priority order 1102 is allocated to a screen (shutting down screen) having the screen ID 1101 of 10000.

The state name 1103 indicates that a shutdown is being executed, and indicates that the shutting down screen is displayed when a shutdown is being executed. The state bit 1104 indicates 1 when the corresponding state currently occurs, and indicates 0 when the corresponding state does not occur. In the table illustrated in FIG. 11, the state bit 1104 associated with the screen ID 1101 of 10000 indicates OFF. This indicates that the image forming apparatus is not executing a shutdown. Thus, the screen having the screen ID 1101 of 10000 is not displayed as a pop-up screen.

On the other hand, a screen (paper jam display screen) having the screen ID 1101 of 10020 has the twentieth highest display priority order 1102, and the state name 1103 indicates that the screen is a screen to be displayed when a paper jam has occurred. In the example of the table illustrated in FIG. 11, the state bit 1104 indicates ON. In other words, a paper jam has occurred in the image forming apparatus.

In addition, a screen (sheet thickness setting screen) having the screen ID 1101 of 10070 has the seventieth highest display priority order 1102, and the state name 1103 indicates that the screen is a pop-up screen to be displayed if a document is placed when the sheet thickness designation setting is set. In the example of the table illustrated in FIG. 11, the state bit 1104 indicates ON. In other words, the state bit 1104 indicates a state where a document is placed when the designation setting 792 is set.

At this time, the state bit 1104 of a screen having a screen ID other than the screens having the screen IDs illustrated in FIG. 11 is set to OFF. In other words, the image forming apparatus is in a state of a paper jam and in a state where a document is installed with the designation setting 792 being set. In this case, because the paper jam display screen having the screen ID 1101 of 10020 has the higher display priority order 1102 than that of the sheet thickness setting screen having the screen ID 1101 of 10070, the paper jam display screen is displayed.

Figure 12:
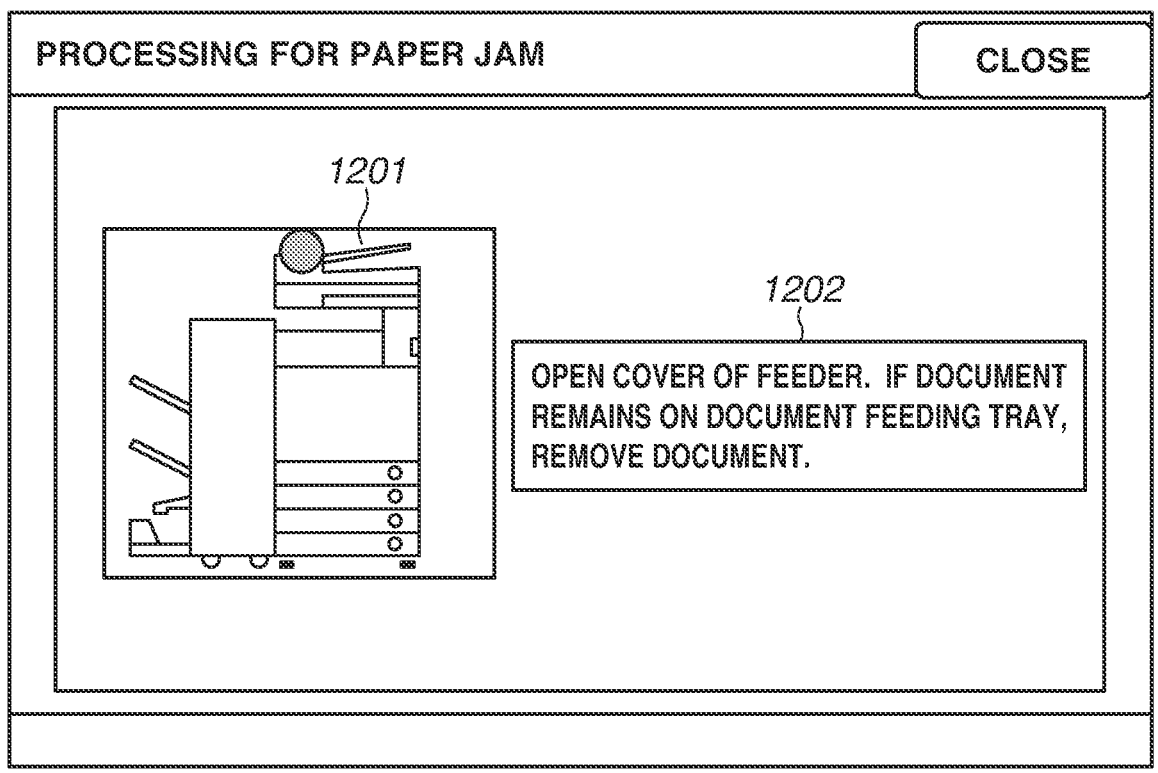
FIG. 12 illustrates an example of a screen displaying a status of a paper jam.

FIG. 12 illustrates an example of an error screen displaying a status of a paper jam. In the example illustrated in FIG. 12, information for promoting the user to clear the paper jam is displayed. An apparatus picture 1201 displaying the position of the paper jam, and a message 1202 for prompting the user to perform processing for the paper jam are displayed. While viewing the screen, the user checks the position where the paper jam has occurred, and removes a sheet remaining in the apparatus without being conveyed. In addition, a next button may be provided on the screen illustrated in FIG. 12, and if the next button is selected, a plurality of procedures necessary for clearing the paper jam may be displayed in order. By following the procedures, the user can remove the paper jam.

Next, with reference to the flowchart illustrated in FIG. 9, the description will be given of the details of processing performed depending on a sheet thickness selection method in an apparatus setting when a document is placed on the ADF 100 and scan is executed according to the present exemplary embodiment.

This flowchart is started from a state where the copy screen 700 is displayed on the LCD touch panel 600. The series of processes is performed by the CPU 401 of the controller unit 400 executing a control program read from the ROM 407 and loaded onto the RAM 406.

In step S901, the CPU 401 determines whether a detection state of the document detection sensor 23 of the ADF 100 has changed, and if the CPU 401 determines that the detection state of a document has changed to "present" from "absent" (YES in step S901), the CPU 401 advances the processing to step S902, and if a document is not detected (NO in step S901), the CPU 401 ends the processing in the flowchart illustrated in FIG. 9.

In step S902, the CPU 401 determines whether a designation setting is saved in the sheet thickness selection method setting 701 saved in the RAM 406. If a designation setting is saved (YES in step S902), the CPU 401 advances the processing to step S903, and if a designation setting is not saved (NO in step S902), the CPU 401 ends the processing in the flowchart illustrated in FIG. 9.

In step S903, the CPU 401 determines whether an error screen displaying a status of a paper jam is currently displayed, based on whether the state bit 1104 associated with the screen having the screen ID 1101 of 10020 in FIG. 11 indicates ON. If the CPU 401 determines that an error screen displaying a status of a paper jam is displayed (YES in step S903), the CPU 401 advances the processing to step S904, and if the CPU 401 determines that an error screen displaying a status of a paper jam is not displayed (NO in step S903), the CPU 401 advances the processing to step S905.

In step S904, the CPU 401 determines whether the paper jam has been cleared, based on whether the state bit 1104 associated with the screen having the screen ID 1101 of 10020 in FIG. 11 indicates OFF. If the CPU 401 determines in step S904 that the paper jam has been cleared (YES in step S904), the CPU 401 returns the processing to step S901. If the CPU 401 determines in step S904 that the paper jam has not been cleared (NO in step S904), the CPU 401 repeats the processing in step S904 and waits until the paper jam is cleared.

In step S905, the CPU 401 displays, on the LCD touch panel 600, with the sheet thickness setting screen 770 illustrated in FIG. 5B being superimposed onto the current screen, and receives the selection of a sheet thickness setting.

In step S906, the CPU 401 determines whether the selection of the OK key 774 has been received, and if the selection of the OK key 774 has been received (YES in step S906), the CPU 401 advances the processing to step S907. If the selection of the OK key 774 has not been received (NO in step S906), the CPU 401 returns the processing to step S905. In step S905, the CPU 401 displays the sheet thickness setting screen 770 on the LCD touch panel 600.

In step S907, the CPU 401 saves information regarding a sheet thickness selected at the time (thick paper/plain paper/thin paper), in the sheet thickness designation setting 703 in the apparatus setting in the RAM 406, and ends the processing in the flowchart illustrated in FIG. 9.

Figure 10B:
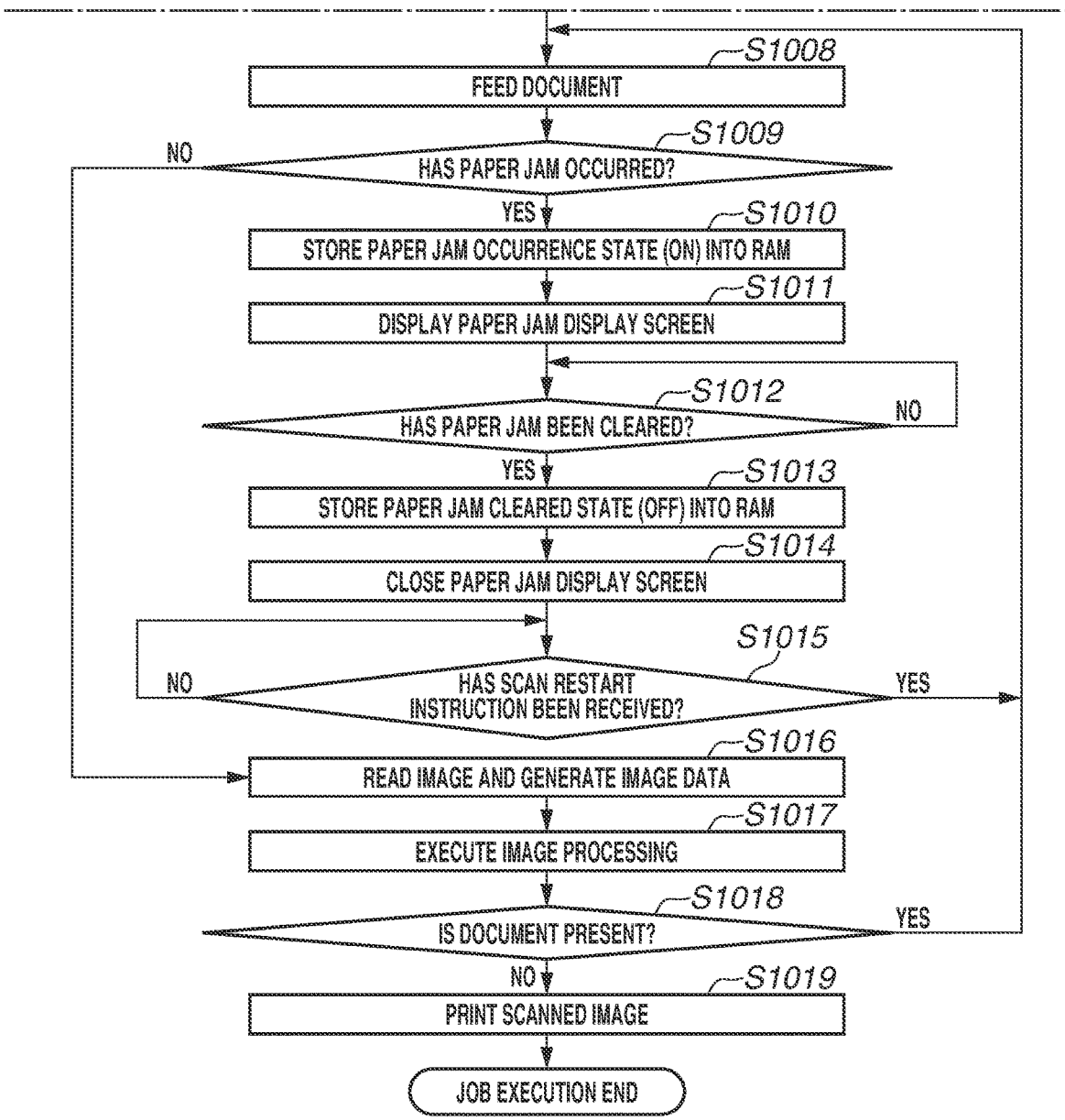

Next, with reference to a flowchart illustrated in FIG. 10, the description will be given of the details of processing performed when a copy job is executed according to the present exemplary embodiment.

The description will be given using copy as an example of a function of performing scan. Nevertheless, the processing may be applied to other functions such as an e-mail transmission function of transmitting, by e-mail, image data representing an image of a scanned document, or a facsimile transmission function of transmitting, by Group 3 Facsimile (G3FAX), image data representing an image of a scanned document.

The series of processes is performed by the CPU 401 of the controller unit 400 executing a control program read from the ROM 407 and loaded onto the RAM 406.

In step S1001, the CPU 401 determines whether the selection of the start key 607 of the operation unit 405 has been received. If the CPU 401 determines that the selection of the start key 607 has been received (YES in step S1001), the CPU 401 advances the processing to step S1002, and if the CPU 401 determines that the selection of the start key 607 has not been received (NO in step S1001), the CPU 401 repeats the processing in step S1001.

In step S1002, the CPU 401 determines a value in the sheet thickness setting 711 in the copy setting 710. If the CPU 401 determines that a sheet thickness is set (YES in step S1002), the CPU 401 advances the processing to step S1006. On the other hand, if the CPU 401 determines that a sheet thickness is not set (NO in step S1002), the CPU 401 advances the processing to step S1003.

In step S1003, the CPU 401 displays, on the LCD touch panel 600, the sheet thickness setting screen 770 illustrated in FIG. 5B being superimposed onto the current screen, and receives the selection of a sheet thickness setting.

Next, in step S1004, the CPU 401 determines whether the selection of the OK key 774 has been received, and if the selection of the OK key 774 has been received (YES in step S1004), the CPU 401 advances the processing to step S1005. If the selection of the OK key 774 has not been received (NO in step S1004), the CPU 401 returns the processing to step S1003.

In step S1005, the CPU 401 saves information regarding a sheet thickness selected at the time (thick paper/plain paper/thin paper), in the sheet thickness designation setting 703 in the apparatus setting in the RAM 406, and advances the processing to step S1006.

In step S1006, the CPU 401 determines a value in the sheet thickness setting 711 in the copy setting 710. If the sheet thickness determined in step S1006 is plain paper (predetermined thickness) ("PLAIN PAPER" in step S1006), the CPU 401 advances the processing to step S1008. If the sheet thickness determined in step S1006 is thick paper (thickness larger than the predetermined thickness) ("THICK PAPER" in step S1006), or if the determined sheet thickness is thin paper (thickness smaller than the predetermined thickness) ("THIN PAPER" in step S1006), the CPU 401 advances the processing to step S1007. In step S1007, the CPU 401 notifies the CPU 300 of the ADF 100 that a document conveyance speed is to be set to a low speed.

If the CPU 300 is notified that a document conveyance speed is to be set to a low speed, the CPU 300 decreases rotating speeds of motors that respectively drive the conveyance roller 3, the registration roller 4, the conveyance roller 5, the conveyance roller 6, the large roller 7, and the sheet discharging roller 8, and controls a conveyance speed to be lower than a normal conveyance speed. For example, the CPU 300 controls a conveyance speed to be half of the normal conveyance speed. As a result, when a document is thick paper, it is possible to overcome the shortage in torque at a curved portion of a conveyance path, and prevent the thick paper document from getting jammed at the curved portion of the conveyance path. Meanwhile, when a document is thin paper, after a discharged thin paper document completely falls, a next document is discharged. With this configuration, it is possible to enhance a stacking property of the sheet discharging unit, and prevent the thin paper document from getting jammed near the sheet discharging unit.

In step S1008, the CPU 401 transmits a sheet feeding start instruction to the CPU 321. Upon receiving the sheet feeding start instruction from the CPU 321, the CPU 300 drives the motor 303 and starts to feed the document. If a notification indicating that a document conveyance speed is to be set to a low speed is not received, the CPU 321 controls the document to be conveyed at the normal conveyance speed. On the other hand, if a notification indicating that a document conveyance speed is to be set to a low speed is received, the CPU 321 controls the document to be conveyed at half conveyance speed of the normal conveyance speed.

In step S1009, the CPU 401 determines whether a paper jam has occurred, based on a signal from the ADF 100. If the CPU 401 determines that a paper jam has occurred (YES in step S1009), the CPU 401 advances the processing to step S1010. On the other hand, if the CPU 401 determines that a paper jam has not occurred (NO in step S1009), the CPU 401 advances the processing to step S1016.

In step S1010, the CPU 401 stores information indicating a paper jam occurrence state, into the RAM 406. Specifically, the CPU 401 changes the state bit 1104 associated with the screen having the screen ID 1101 of 10020 to ON. After that, the CPU 401 advances the processing to step S1011.

In step S1011, the CPU 401 displays, on the LCD touch panel 600, the paper jam display screen illustrated in FIG. 12 being superimposed on the current screen, and advances the processing to step S1012.

In step S1012, the CPU 401 determines whether the paper jam has been cleared. More specifically, the CPU 401 determines whether any unremoved sheet remains on the conveyance path of the document, based on signals from the sensors 304. Then, if no unremoved sheet remains, the CPU 401 determines that the paper jam has been cleared (YES in step S1012), and advances the processing to step S1013. On the other hand, if any unremoved sheet remains, the CPU 401 determines that the paper jam has not been cleared (NO in step S1012), and repeats the processing in step S1012.

In step S1013, the CPU 401 stores information indicating a paper jam cleared state, into the RAM 406. Specifically, the CPU 401 changes the state bit 1104 associated with the screen having the screen ID 1101 of 10020 to OFF. After that, the CPU 401 advances the processing to step S1014.

In step S1014, the CPU 401 controls display so as to close the paper jam display screen in FIG. 12 that is displayed on the LCD touch panel 600, and advances the processing to step S1015.

In step S1015, the CPU 401 determines whether a scan restart instruction for restarting scan has been received. If the CPU 401 determines that a scan restart instruction has been received (YES in step S1015), the CPU 401 returns the processing to step S1008, and if the CPU 401 determines that a scan restart instruction has not been received (NO in step S1015), the CPU 401 repeats the processing in step S1015.

In step S1016, the image reading unit 200 reads an image on the document and generates image data.

The generated image data is transmitted to the controller unit 400 via the image data information communication line 353 and saved into the image memory 404 via the scanner IF 403.

In step S1017, the CPU 401 executes image processing on the image data saved in the image memory 404.

In step S1018, the CPU 321 determines whether a document is present on the document installation tray 30, and if the CPU 321 determines that a document is present (YES in step S1018), the processing returns to step S1008, and if the CPU 321 determines that a document is absent (NO in step S1018), the processing proceeds to step S1019.

In step S1019, the CPU 401 transmits the image data and a printing instruction to the image forming unit 500, and causes the image forming unit 500 to execute printing. In the case of executing e-mail transmission or facsimile transmission, in step S1019, the CPU 401 is only required to perform processing of transmitting the data to a destination designated by the user, instead of transmitting a printing instruction.

In the present exemplary embodiment, a sheet thickness setting screen is displayed upon detecting that a document is placed in a state where an error screen displaying a status of a paper jam is not displayed, and when a document is placed in a state where an error screen displaying a status of a paper jam is displayed, a sheet thickness setting screen is not displayed.

According to the present exemplary embodiment as described above, while a thickness setting screen is displayed upon detecting that a document is placed on a document tray, a specific screen desired to be continuously displayed can be prevented from being hidden upon detecting that a document is placed on a document tray. Thus, when a paper jam has occurred, by preferentially displaying a screen for clearing the paper jam, it is possible to avoid impairing user-friendliness.

In addition, if a paper jam occurs during job execution, after the paper jam is cleared, by restarting the job with successively using the thickness setting saved in step S1005, without displaying a sheet thickness setting screen, it becomes possible to save the user's trouble of performing a sheet thickness setting again on the sheet thickness setting screen.

Other Exemplary Embodiments

In the above-described exemplary embodiment, the description has been given using a paper jam display screen as an example of a specific screen, but the specific screen is not limited to this. For example, the specific screen may be a screen such as the user mode screen to be displayed by the press of the user mode key 605. With this configuration, it is possible to prevent an apparatus setting from being disturbed by the user mode screen switching to a sheet thickness setting screen upon detecting that a document is placed when the apparatus setting of an image forming apparatus is being performed on the user mode screen.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-007943, filed Jan. 21, 2019, which is hereby incorporated by reference herein in its entirety.

What is claimed is:

1. An image reading apparatus comprising:
a detection unit configured to detect a document sheet on a document tray;
a display unit configured to display a setting screen for setting a thickness of the detected document sheet;
a conveyance control unit configured to control conveyance by a conveyance unit of the document sheet based on information indicating the thickness set on the setting screen displayed by the display unit; and
a reading unit configured to read an image on the document sheet conveyed by the conveyance unit,
wherein the display unit displays, based on the detection unit detecting the document sheet in a state that a first predetermined screen is displayed by the display unit, the setting screen so that at least a part of the first predetermined screen is hidden by the setting screen, and
wherein the display unit does not display the setting screen based on the detection unit detecting the document sheet in a state that a second predetermined screen, different from the first predetermined screen, is displayed by the display unit.

2. The image reading apparatus according to claim 1, wherein the second predetermined screen is an error screen.

3. The image reading apparatus according to claim 1, wherein the second predetermined screen is an error screen displaying a jam of the document sheet.

4. The image reading apparatus according to claim 3, further comprising a storage unit configured to store information indicating a thickness, of another document sheet, that is set on the setting screen displayed by the display unit, wherein, based on detection of the jam of the another document sheet, the display unit displays the error screen displaying the jam of the another document sheet, wherein the display unit does not display the setting screen based on detecting, by the detecting unit, the document sheet in a state that the error screen is displayed by the display unit, and wherein, after the jam of the document sheet is released, the conveyance control unit controls the conveyance unit to convey the document sheet based on information stored in the storage unit.

5. The image reading apparatus according to claim 1, wherein the conveyance control unit controls the conveyance unit to convey the document sheet at a conveyance speed that is based on the information indicating the thickness of the document sheet that is set on the setting screen displayed by the display unit.

6. The image reading apparatus according to claim 5, wherein, in a case where the thickness of the document sheet that is set on the setting screen displayed by the display unit is larger than a predetermined thickness, the conveyance control unit decreases a conveyance speed of the document sheet to a conveyance speed lower than a conveyance speed set in a case where the thickness of the document sheet is the predetermined thickness.

7. The image reading apparatus according to claim 5, wherein, in a case where the thickness of the document sheet that is set on the setting screen displayed by the display unit is smaller than a predetermined thickness, the conveyance control unit decreases a conveyance speed of the document sheet to a conveyance speed lower than a conveyance speed set in a case where the thickness of the document sheet is the predetermined thickness.

8. The image reading apparatus according to claim 1, further comprising a printing unit configured to print an image on the document sheet read by the reading unit.

9. The image reading apparatus according to claim 1, further comprising a transmission unit configured to transmit image data generated based on an image on the document sheet read by the reading unit.

10. The image reading apparatus according to claim 1, wherein the second predetermined screen is a screen relating to a jam.

11. The image reading apparatus according to claim 1, wherein the second predetermined screen is a screen of a user mode.

12. A control method of an image reading apparatus, the control method comprising:

detecting a document sheet on a document tray;

displaying, on a display unit, a setting screen for setting a thickness of the detected document sheet;

controlling conveyance of the document sheet based on information indicating the thickness set on the setting screen displayed by the display unit; and reading an image on the conveyed document sheet, wherein the display unit displays, based on detecting including detecting the document sheet in a state that a first predetermined screen is displayed by the display unit, the setting screen so that at least a part of the first predetermined screen is hidden by the setting screen, and wherein the display unit does not display the setting screen based on detecting including detecting the document sheet in a state that a second predetermined screen, different from the first predetermined screen, is displayed by the display unit.

13. A non-transitory computer-readable storage medium storing a program to cause a computer to perform a control method of an image reading apparatus, the control method comprising:

detecting a document sheet on a document tray;

displaying, on a display unit, a setting screen for setting a thickness of the detected document sheet;

controlling conveyance of the document sheet based on information indicating the thickness set on the setting screen displayed by the display unit; and reading an image on the conveyed document sheet, wherein the display unit displays, based on detecting including detecting the document sheet in a state that a first predetermined screen is displayed by the display unit, the setting screen so that at least a part of the first predetermined screen is hidden by the setting screen, and wherein the display unit does not display the setting screen based on detecting including detecting the document sheet in a state that a second predetermined screen, different from the first predetermined screen, is displayed by the display unit.

14. An image reading apparatus comprising:

a detection unit configured to detect a document sheet on a document tray;

a display unit configured to display a setting screen for setting a type of the detected document sheet;

a conveyance control unit configured to control conveyance by a conveyance unit of the document sheet based on information indicating the type set on the setting screen displayed by the display unit; and a reading unit configured to read an image on the document sheet conveyed by the conveyance unit, wherein the display unit displays, based on the detection unit detecting the document sheet in a state that a first predetermined screen is displayed by the display unit, the setting screen so that at least a part of the first predetermined screen is hidden by the setting screen, and wherein the display unit does not display the setting screen based on the detection unit detecting the document sheet in a state that a second predetermined screen, different from the first predetermined screen, is displayed by the display unit.

15. The image reading apparatus according to claim 14, wherein the second predetermined screen is an error screen.

16. The image reading apparatus according to claim 14, wherein the second predetermined screen is an error screen displaying a jam of the document sheet.

17. The image reading apparatus according to claim 14, wherein the second predetermined screen is an error screen displaying a jam.

18. The image reading apparatus according to claim 14, wherein the second predetermined screen is a screen of a user mode.

* * * * *